April 2, 1963   F. R. SWANSON ETAL   3,083,617
MACHINE TOOL
Filed Feb. 13, 1958   6 Sheets-Sheet 1

INVENTORS.
Fred R. Swanson
Carl F. Erikson
BY Schroeder, Hofgren,
Brady & Wegner
Attys.

April 2, 1963

F. R. SWANSON ETAL 3,083,617

MACHINE TOOL

Filed Feb. 13, 1958

INVENTORS.
Fred R. Swanson
Carl F. Erikson
BY Schraeder, Hofgren,
Brady & Wegner
Attys.

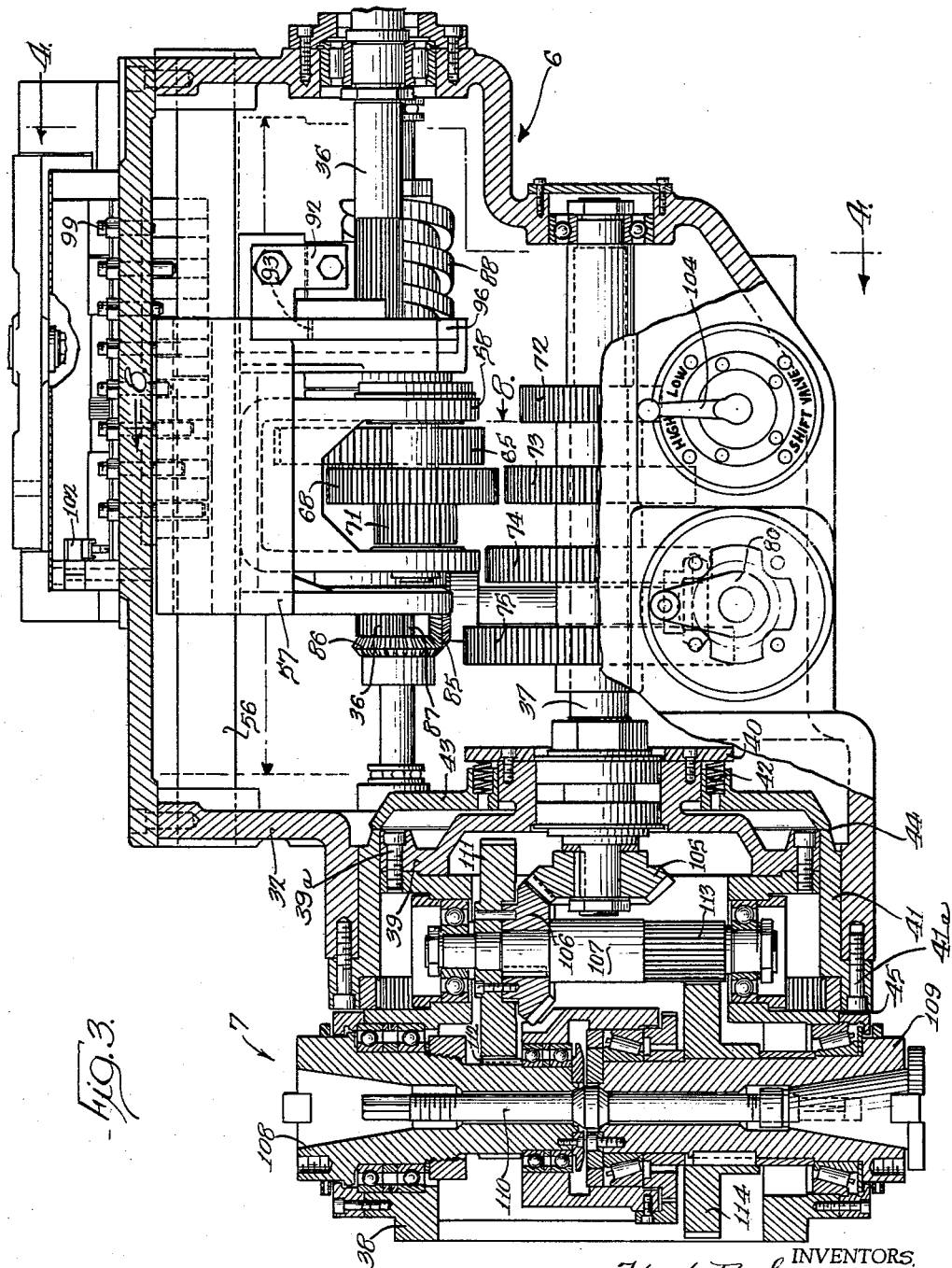

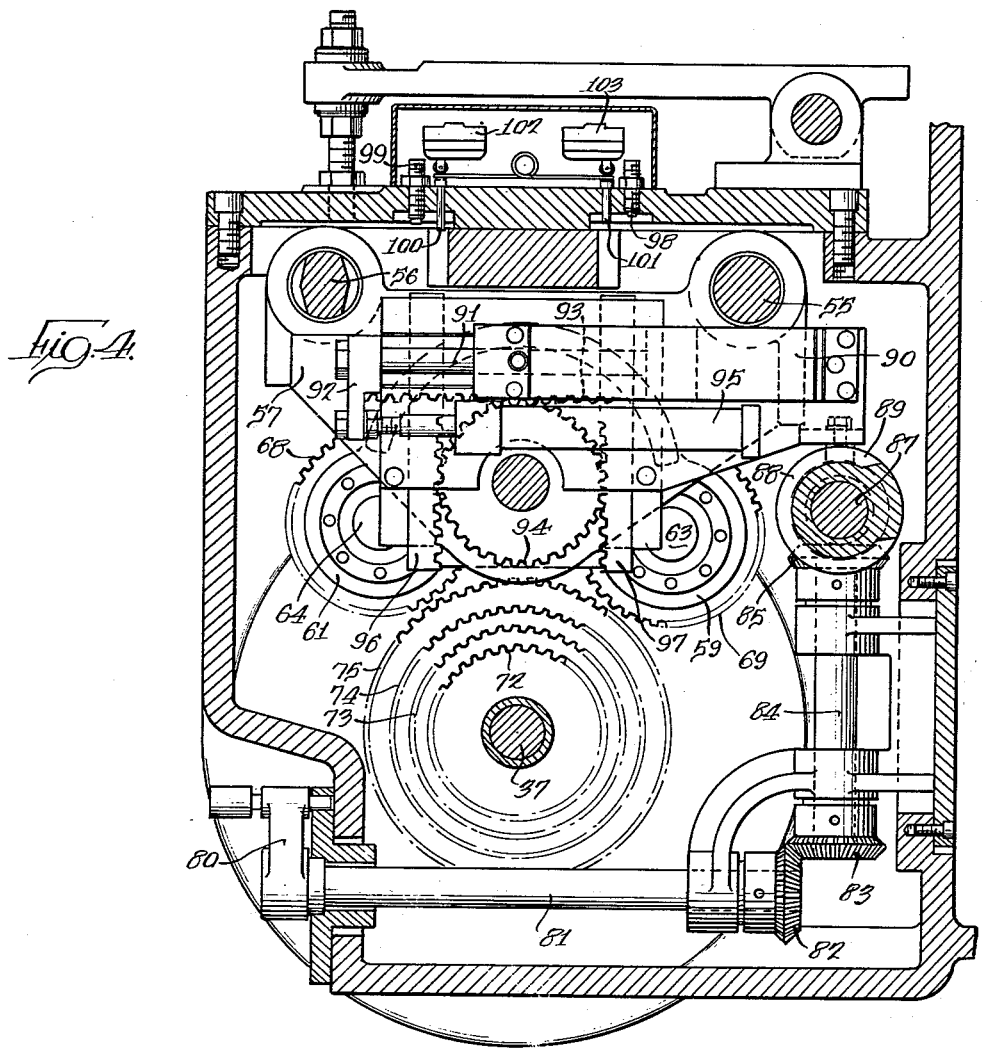

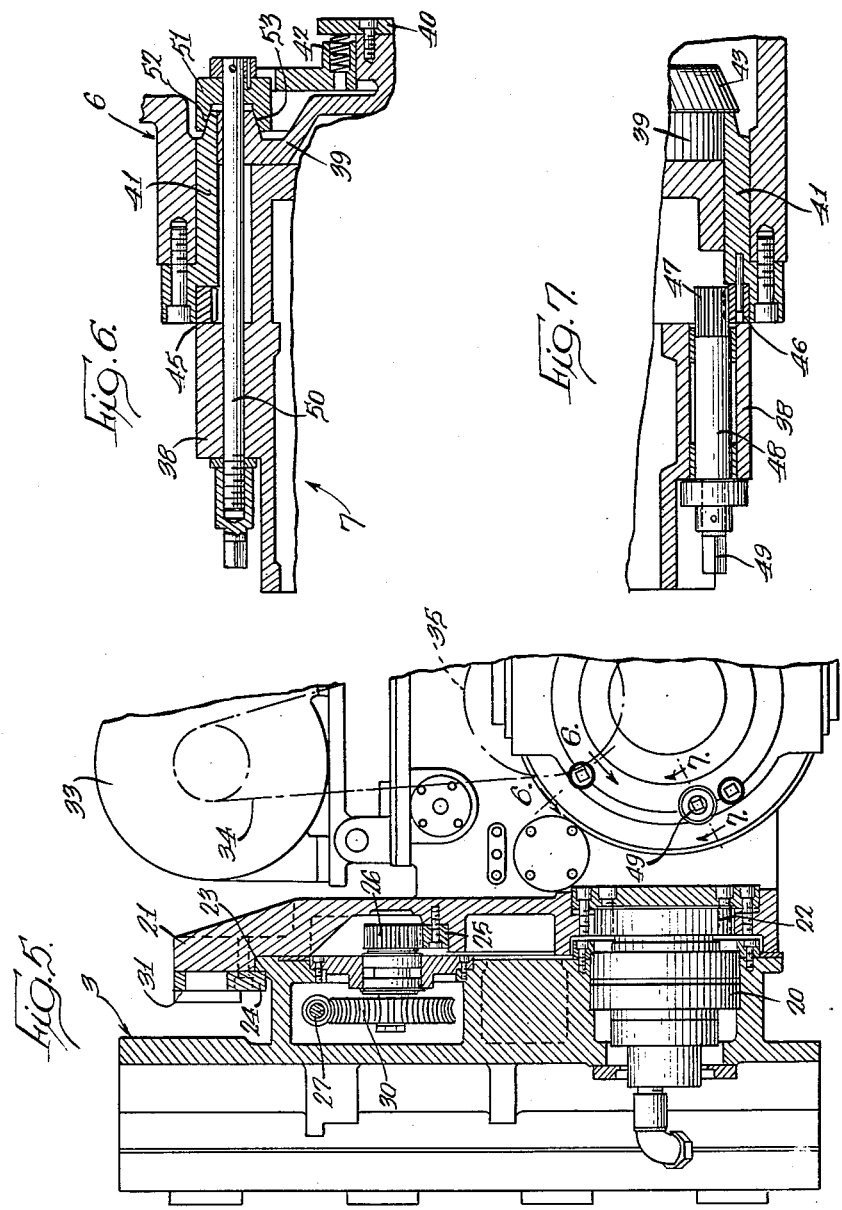

April 2, 1963
F. R. SWANSON ETAL
3,083,617
MACHINE TOOL
Filed Feb. 13, 1958
6 Sheets-Sheet 6
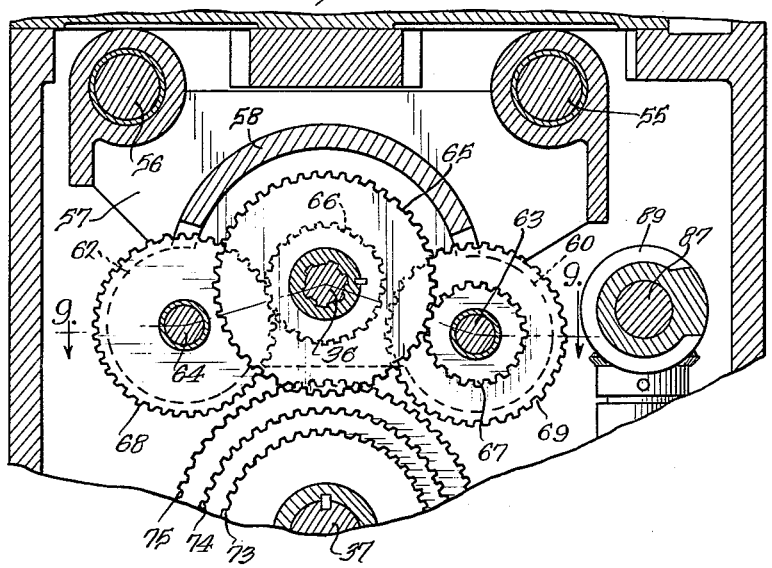
INVENTORS.
Fred R. Swanson
Carl F. Erikson
BY Schroeder, Hofgren,
Brady & Wegner
Attys.

United States Patent Office 3,083,617
Patented Apr. 2, 1963

3,083,617
MACHINE TOOL
Fred R. Swanson, Rockford, and Carl F. Erikson, Belvidere, Ill., assignors to Sundstrand Corporation, a corporation of Illinois
Filed Feb. 13, 1958, Ser. No. 715,109
8 Claims. (Cl. 90—17)

This invention relates to a machine tool and more particularly to a milling machine or the like.

An object of this invention is to provide a new and improved milling machine with maximum range and flexibility to perform milling operations on ferrous or non-ferrous parts in various shapes and sizes.

Another object of this invention is to provide a new and improved spindle head having movements about two different axes.

Another object of the invention is to provide a milling machine having a spindle head mounted for universal movement to present a tool extending in any desired direction toward a workpiece in which the spindle head is supported on relatively big sturdy parts whereby the tool may be used to full capacity and there is sufficient bulk to absorb cutter vibration and prevent yield during cutting.

A further object of the invention is to provide a universal milling machine comprising a bed, means including a table on the bed for movably supporting a workpiece, a column upstanding from one side of the table and having vertical ways, a main slide mounted on said ways for up on down movement relative to said table, a transmission head mounted on said vertical slide for pivotal adjusting movement about an axis extending normal to the movement of the main slide, a spindle head mounted on the transmission head for rotational adjustment about an axis at right angles to said first mentioned axis, and means for adjusting said heads and holding the heads in adjusted positions.

Further objects of the invention are to provide a new and improved multi-speed transmission in the transmission head including a speed selecting rocker frame and manually operable means therefor; and to provide a spindle head having a low speed spindle and a high speed spindle, each spindle being supported by bearings of a type required for the speed thereof to provide a wide range of spindle speeds with a greater range of speeds at maximum torque.

Further objects and advantages will become apparent from the following detailed description taken in connection with the accompanying drawings in which:

FIG. 3 is a vertical section on an enlarged scale through the transmission and spindle heads taken generally along the line 3—3 in FIG. 2;

FIG. 4 is a vertical section on an enlarged scale through the transmission head taken generally along the line 4—4 in FIG. 3;

FIG. 5 is a fragmentary side elevational view on an enlarged scale of the column and spindle and transmission heads with parts in section taken generally along the line 5—5 in FIG. 1;

FIG. 6 is a sectional view on an enlarged scale of the clamp mechanism for securing the spindle head to the transmission head and taken generally along the line 6—6 in FIG. 5;

FIG. 7 is a sectional view on an enlarged scale of the mechanism for adjusting the spindle head on the transmission head and taken generally along the line 7—7 in FIG. 5;

FIG. 8 is a vertical section through the multi-speed transmission taken generally along the line 8—8 in FIG. 3; and FIG. 9 is a plan section taken generally along the line 9—9 in FIG. 8.

Figure 1:
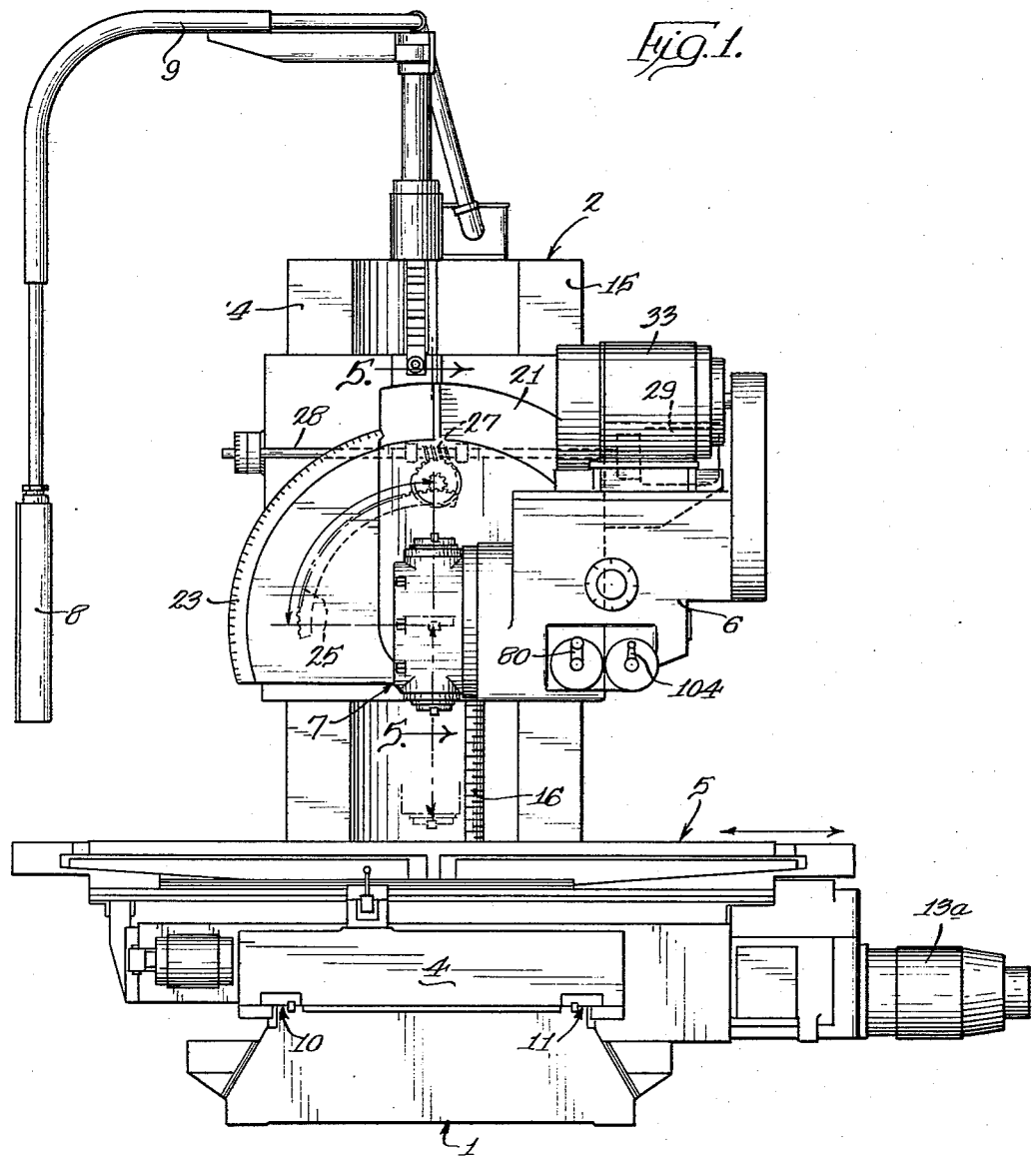
FIG. 1 is a front elevational view of the milling machine.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 2:
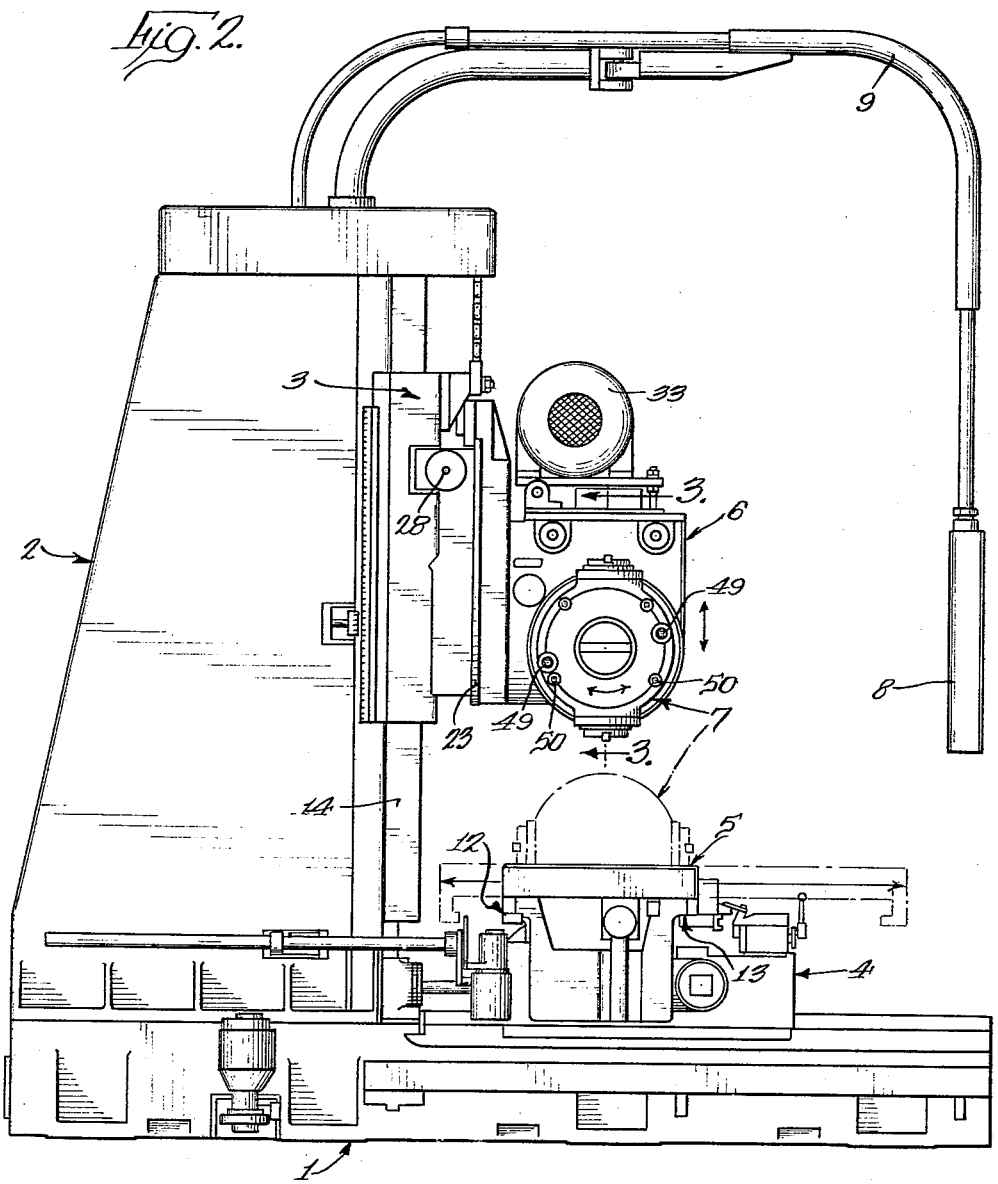
FIG. 2 is a side elevational view of the milling machine looking toward the left in FIG. 1.

The milling machine as shown generally in FIGS. 1, 2 and 5 comprises an elongated bed 1 formed to rest on a supporting surface, a column 2 upstanding from the bed 1 at one end thereof and a main slide 3 movably mounted on the column 2 for up and down movement relative to the bed. The milling machine also includes a cross slide 4 movable on the bed toward and away from the column 2 and which carries a work supporting table 5 for movement transversely to the movement of the cross slide 4. The main slide 3 adjustably carries a transmission head 6 and a spindle head 7 is adjustably carried on the transmission head 6. A control box 8 for the movable components of the machine is supported on a pendant 9.

The bed 1 and column 2 are connected together to form a relatively big massive structure with the bed 1 being relatively short in height so that a workpiece supported on the table 5 is readily visible to an operator standing adjacent thereto and holding the control box 8. The cross slide 4 and bed 1 are formed with coacting ways indicated generally at 10 and 11 which slidably support the cross slide in its movement toward and away from the column 2. The cross slide 4 and table 5 are provided with coacting ways indicated generally at 12 and 13 which slidably support the table 5 in its movement in a direction transverse to the movement of the cross slide 4 and the resultant movement of a workpiece may be that resulting from movement components of cross slide 4 and table 5. A motor 13a and gearing (not shown) move the table and cross slide in the desired manner.

The column 2 has ways 14 and 15 on which the main slide 3 is mounted for up and down movement and the main slide is moved by a screw 16, shown in FIG. 1, driven from the motor 13a.

The main slide 3 mounts the transmission head 6 for pivotal adjustment about an axis extending normal to the column ways 14 and 15 and coincident with the center of a bearing 20 (FIG. 5) which aids in pivotally supporting the transmission head 6 on the main slide 3. The transmission head 6 has a base 21 to which a tubular member 22 is affixed and which extends through the bearing 20 which is supported in the main slide 3. The tubular member 22 forms a passage through which hydraulic and electrical lines may extend into transmission head 6 from the column 2 of the machine. The main slide 3 is formed with an arcuate way 23 which is curved about the axis of pivoting of the transmission head 6 and a coacting way and guide 24 on the transmission head base 21 confine the transmission head for movement on the main slide way 23. The head base 21 carries an arcuate rack 25 which is engaged by a gear 26. The gear 26 may be rotated either manually or by a motor to rotatably adjust the position of the transmission head 6. As shown in FIGS. 1 and 5, a worm 27 is on a manually operable shaft 28 and rotation of the worm 27 rotates a worm wheel 30 connected to the gear 26. The shaft 28 may be operated by a motor 29. As shown in FIG. 5 the guide 24 is loosely mounted on the head base 21 and may be drawn more tightly against the slide way 23 to clamp the transmission head 6 to the main slide. Suitable hydraulic mechanism (not shown) controls the positioning of the guide 24.

The transmission head 6 includes a casing 32 connected to the head base 21 which supports a drive motor 33 which is connected by a belt drive mechanism 34 to a drive pulley 35 connected to an input shaft 36 (FIG. 3) rotatably supported at one end in the head casing 32 and at the other by a rocker frame referred to hereinafter. The transmission head casing 32 also contains a multi-speed transmission described in detail hereinafter and having an output shaft 37 extending in spaced parallel relation with the input shaft 36.

The spindle head 7 has a housing with parts 38, 39 and 40 connected together and rotatably mounted on the transmission head 6 for rotation about an axis extending normal to the axis of rotation for the transmission head and coinciding with the axis of the transmission output shaft 37. The spindle head housing parts 38 and 39 connected by bolts 39a engage within a sleeve 41 secured to the transmission head housing 32 by bolts 41a to guide the spindle head relative to the transmission head. Means are provided for preventing sag of the spindle head 7 relative to the transmission head 6 during setting up of the spindle head including a series of springs 42 nested in a disc 43 and engageable with the spindle head housing part 40. The rim of the disc 43 engages with a part of the transmission head housing as indicated at 44 in FIG. 3. The springs 42 function to hold the spindle head tightly against the transmission head with the spindle head housing part 38 in abutting relation with an end of the sleeve 41, as indicated at 45.

Means are provided for rotatably adjusting the spindle head 7 on the transmission head 6 and, as shown in FIG. 7, includes a rack 46 fixed to the transmission head housing sleeve 41 and engaged by a gear 47 formed on a shaft 48 rotatably mounted in the spindle head housing part 38. The shaft 48 has an outer end 49 externally exposed for application of a suitable tool for rotation of the shaft. As shown in FIGS. 2 and 5, there are a plurality of the shafts 48 and operation of any one of these will adjust the spindle head.

Means for clamping the spindle head 7 in adjusted position includes a plurality of longitudinally movable rods 50 slidably mounted in the spindle head housing part 38 and carrying a clamp member 51 at one end thereof provided with internal cam surfaces to engage interfitting parts on the transmission head housing sleeve 41 and the spindle head housing part 39. The engagement between these parts is indicated at 52 and 53 respectively in FIG. 6. With the rod 50 drawn toward the left as viewed in FIG. 6 the clamp member 51 is drawn toward the left to tightly engage with the sleeve 41 and housing part 39.

When locking bolt 50 is loosened and shaft 48 turned for adjusting the spindle 109 the following parts rotate as a unit, namely, housing 38 and housing 39 because of the fastening bolts 39a. Since disc 43 is a part of housing 39 and bolt 50 is mounted within housing 38 and 39 as well as disc 43, it can readily be seen that housings 38 and 39 with spindle 109 rotate relative to sleeve 41 which is fixed to housing 6.

The multi-speed transmission within the transmission head housing 32 is shown particularly in FIGS. 3, 4, 8 and 9. This transmission includes the input shaft 36 and the output shaft 37 previously referred to. A pair of rods 55 and 56 are mounted in the housing 32 and extend parallel to the input shaft 36 to slidably mount a frame 57 and a rocker frame 58 is mounted on the slidable frame 57 for rocking movement about the input shaft 36. The rocker frame 58 has a pair of spaced arms 59 and 60 extending to one side of the input shaft 36 and a second pair of arms 61 and 62 extending to the other side of the input shaft 36. The arms 59 and 60 rotatably mount a stub shaft 63 and the arms 61 and 62 rotatably mount a stub shaft 64. A pair of gears 65 and 66 are secured to a sleeve 66a which is slidable on input shaft 36 and keyed thereto. The sleeve 66a is rotatably mounted in rocker frame 58 by bearings 66b and 66c and also functions to support the input shaft 36 confined within the rocker. The gear 65 meshes with a gear 67 having a lesser number of teeth to form a step-up drive for the stub shaft 63 while the gear 66 meshes with a gear 68 having a larger number of teeth to form a step-down speed connection for the stub shaft 64. In addition to the gear 67 the stub shaft 63 also has gears 69 and 70. In addition to gear 68 the stub shaft 64 has a gear 71. The gears 70, 71 have an equal number of teeth as do the gears 68, 69.

The output shaft 37 has a cluster of different diameter output gears 72, 73, 74 and 75 with varying numbers of teeth and is located generally beneath the input shaft 36. The slidable frame 57 is moved to align either of the gears 68 and 69 with one of the gears on the output shaft or to align one of the gears 70 and 71 on the rocker frame with a gear on the output shaft 37. At this point the transmission is set to provide either of two speeds to the output shaft 37. The rocker frame 58 is then pivoted about the input shaft 36 to mesh one or the other of the gears on the rocker frame with an output gear dependent upon the direction of pivoting of the rocker frame 58. If the rocker frame pivots clockwise, as shown in FIG. 8, the output shaft, as a result, will be driven at the higher of the two possible speeds. If the rocker frame pivots counterclockwise, the output shaft will be driven at the lower of the two speeds.

Means for shifting the slidable frame 57 along the rods 55 and 56 comprises a handle 80, a shaft 81, bevel gears 82 and 83, a vertically extending shaft 84 and bevel gears 85 and 86. The bevel gear 86 is secured to a rotatably mounted shaft 87 carrying a spiral cam 88 arranged to have eight longitudinally spaced dwell positions for a cam follower 89 fastened to the slidable frame 57. Each revolution of the spiral cam 88 will shift the slidable frame 57 the distance of one dwell in the spiral cam to shift the alignment of a gear on the rocker frame with the output gears. With a total of four output gears there are eight positions of the slidable frame 57 to align either of the two gears on the rocker frame with the output gears.

Means are provided for pivoting the rocker frame 58 in a clockwise direction for a high speed drive as viewed in FIG. 4 or for shifting the rocker frame counterclockwise to provide for a low speed drive. This means includes a hydraulic cylinder 90 having a piston rod 91 connected to a member 92 carrying a rack 93 engageable with a gear 94 fixed to the rocker frame 58 whereby movement of the rack will rotate the gear 94 and the rocker frame 58. A suitable spring mechanism is mounted within housing 95 for returning the rocker frame 58 to the neutral position shown in FIG. 4 when pressure is released from the hydraulic cylinder 90. The gear 94 also engages a pair of slidably mounted racks 96 and 97 at opposite sides thereof and arranged to travel in opposite directions. A series of stops 98, 99, are mounted in the top of transmission housing 32 and positioned properly to engage the racks 97 and 96, respectively, to limit the pivoting movement of the rocker frame 58. As shown in FIG. 4, if the rocker frame is pivoted clockwise, the rack 96 will rise into engagement with the stop 99 to limit the pivoting movement of the rocker frame. If the rocker frame is moved in the opposite direction, the rack 97 will function with the stop 98. The racks 96 and 97 also function with switch operating plungers 100 and 101 to operate the switches 102 and 103 to detect completion of the pivoting movement of the rocker frame and the fact that gears are in mesh.

As shown in FIGS. 1 and 3, a control handle 104 is mounted on the transmission head to control the operation of the hydraulic cylinder 90 through a circuit (not shown).

The output shaft 37 of the transmission head also constitutes an input shaft for the spindle head 7 and carries beveled gear 105 on an end thereof which meshes with a bevel gear 106 fixed to a rotatably mounted stub shaft 107. The spindle head 7 has a high speed spindle 108 and a low speed spindle 109 extending from opposite ends thereof. The high speed spindle is supported by ball bearings to provide the relatively loose spindle mounting required for high speed operation while the low speed spindle is supported by roller bearings to provide a relatively tight mounting of the spindle as required for low speed operation. A common draw bar 110 is provided for both spindles. The high speed spindle is driven from the stub shaft 107 by meshing step-up gears 111 and 112 and the low speed spindle 109 is driven by meshing step-down gears 113 and 114.

The machine as described herein results in the universal mounting of spindle head so as to present either spindle at any desired angle relative to a workpiece wherein the usable area of the table remains the same regardless of the choice of spindle. The spindle head 7 is mounted on a sturdy base including the transmission head 6 which is arranged to include a multi-speed transmission and also support the drive motor to provide a rigid support for the spindle head 7. The multi-speed transmission provides for a low range and a high range of speeds for the spindles 108 and 109 and is shown with a total of eleven gears and no clutches. The output shaft 37 is given a range of sixteen speeds. The arrangement of a high speed spindle 108 and a low speed spindle 109 in the spindle head 7 provides for a high-speed and low-speed ratio therebetween and each of the spindles has a total of sixteen speeds by the particular transmission disclosed herein. The use of two spindles provides for a maximum range of speeds at maximum torque. As an example, the milling machine disclosed herein may have a range of speeds encountered in machining of air frame parts which varies from the low speed required for high tensile steel or titanium to the high speed required for aluminum and magnesium. The use of two spindles also enables the use of proper bearings for each of the spindles in its speed range, and makes possible maximum torque and minimum gear speed through the gear train.

We claim:

1. A spindle head, a spindle rotatably mounted in said head, a member, means mounting the spindle head on said member for pivotal movement about an axis approximately normal to the spindle axis and releasably and rigidly connecting said spindle head and member, means mounting said member for pivotal movement about an axis approximately normal to the pivotal axis of the spindle head, a bed, a column upstanding from the bed, a relatively movable table and cross-slide movably mounted on said bed, means mounting said member to the column, and a drive motor and multi-speed transmission connected to said spindle and carried by said member to provide sufficient bulk for more effectively absorbing vibration during operation of the spindle head.

2. A spindle head, a spindle rotatably mounted in said head, a member including a power source for the spindle head, means mounting the spindle head on said member for pivotal movement about an axis approximately normal to the spindle axis, means mounting said member for pivotal movement about an axis approximately normal to the pivotal axis of the spindle head, a second spindle rotatably mounted in said head, said spindles being respectively high speed and low speed and extending to opposite ends of the head, high speed bearings mounting said high speed spindle, and low speed bearings mounting said low speed spindle, said spindle head mounting means including inter-engaging parts on the head and member, spring means yieldably urging said parts into engagement to prevent sag of the spindle head during adjustment thereof, and externally operable means for locking said spindle head in adjusted position including clamp members tightly engaging parts of said head and member.

3. A universal milling machine comprising, an elongated bed formed to overlie and rest on a supporting surface, a column upstanding from one end of the bed, a way-mounted cross slide on said bed movable toward and away from the column, a way-mounted table on said cross slide movable transversely to the movement of said cross slide for supporting a workpiece for movement consisting of any combination of table and cross slide movements, a way-mounted main slide overlying the bed and mounted on the column for movement toward and away from the table, a transmission head mounted on the main slide for pivotal adjustment about a horizontal axis extending parallel to the bed and having a spindle power source and a multiple speed adjustable transmission supported thereby, a spindle head carrying a pair of oppositely extending spindles mounted on the transmission head for pivotal movement about an axis approximately normal to the axis of transmission head rotation to present one or the other of the spindles to the workpiece at a desired angle, the spindles being arranged to rotate at a series of speeds with a high speed-low speed ratio between the speeds of the two spindles, means for adjusting and clamping the transmission head and the spindle head in a desired position with one or the other of the spindles directed toward the table at any desired angle or lying in a plane parallel to the table and at any angle in said plane.

4. A machine tool comprising, an elongated bed formed to overlie and rest on a supporting surface, a column upstanding from the bed, means movably mounted on the bed for movably supporting a workpiece, a main slide movably mounted on the column for movement toward and away from the bed, a transmission head mounted on the main slide for pivotal adjustment about a horizontal axis and having a spindle power source and a multiple speed adjustable transmission supported thereby, a spindle head carrying a pair of oppositely extending spindles mounted on the transmission head for pivotal movement about an axis generally normal to the axis of transmission head rotation to present one or the other of the spindles to the workpiece at a desired angle, the spindles being arranged to rotate at a series of speeds with a high speed-low speed ratio between the speeds of the two spindles, means for adjusting and clamping the transmission head and the spindle head in a desired position with one or the other of the spindles directed toward the bed at any desired angle or lying in a plane parallel to the bed and at any angle in said plane.

5. A machine tool as defined in claim 4 in which the means for adjusting and clamping the transmission head and the spindle head, includes, a curved rack on said transmission head, a rack engaging gear and an externally operable member operatively connected to the gear mounted on said main slide, a second rack on said transmission head, a plurality of second rack engaging gears and externally operable members operatively connected thereto mounted on said spindle head, and clamp members for locking the transmission head to the main slide and the spindle head to the transmission head.

6. A milling machine comprising, in combination, a bed, a column, a relatively movable table and cross-slide assembly movably mounted on said bed for supporting a workpiece for movement consisting of any combination of table and cross-slide rectilinear movements, a spindle head having a spindle adapted to carry a tool, means mounting said spindle head for rotatable adjustment about an axis generally normal to said spindle including a transmission casing supporting said spindle head, means releasably rigidly connecting said spindle head and transmission casing, means mounting said transmission casing on the column for pivotal movement about an axis generally normal to said first axis whereby rotatable adjustment of the transmission casing results in movement of said adjustment axis of the spindle head whereby the spindle may have universal adjustment to enable the tool to extend downwardly in any desired direction relative to a workpiece, and a drive motor and multi-speed transmission carried by said transmission casing to provide a short-coupled drive to the spindle and provide a sturdy, heavy support for the spindle head to prevent yield and vibration of the spindle head.

7. A milling machine comprising, in combination, a bed, a column upstanding from the bed, a relatively movable table and cross-slide assembly movably mounted on said bed for supporting a workpiece for movement consisting of any combination of table and cross-slide rectilinear movements, a spindle head having a spindle adapted to carry a tool, means mounting said spindle head for rotatable adjustment about an axis generally normal to said spindle including a transmission head supporting said spindle head, and means mounting said transmission head on the column for pivotal movement about an axis generally normal to said first axis whereby rotatable adjustment of the transmission head results in movement of said adjustment axis of the spindle head whereby the spindle and said assembly have universal adjustment relative to each other to enable the tool to extend in any desired direction relative to a workpiece.

8. A milling machine comprising, a work support, a vertically extending column, a way mounted slide on said column movable up and down relative to the work support, a transmission head mounted on said slide having a motor and a multiple speed adjustable transmission including an output shaft supported thereby, means mounting said transmission head on said slide for pivoted adjusting movement about an axis generally normal to the movement of said slide, a spindle head mounted on said transmission head, means including inter-engaging parts on said heads mounting said spindle head for rotatable adjustment about said output shaft and an axis generally normal to said first axis to direct either end of the spindle head toward the work support, spring means yieldably urging said parts into engagement to prevent sag of the spindle head during adjustment thereof, and externally operable means for locking said spindle head in adjusted position including clamp members tightly engaging parts of said heads, a pair of spindles in said spindle head extending to opposite ends thereof, and means in said spindle head associated with said output shaft to drive said spindles in a high speed-low speed ratio.

References Cited in the file of this patent

UNITED STATES PATENTS

| | | |
|---|---|---|
| 463,790 | Quint | Nov. 24, 1891 |
| 989,733 | Townsend | Apr. 18, 1911 |
| 1,053,625 | Mill | Feb. 18, 1913 |
| 2,307,222 | Johnson | Jan. 5, 1943 |
| 2,310,870 | Retterath | Feb. 9, 1943 |
| 2,342,829 | Armitage | Feb. 29, 1944 |
| 2,344,434 | Wigglesworth et al. | Mar. 14, 1944 |
| 2,538,625 | Moore | Jan. 16, 1951 |
| 2,595,461 | James | May 6, 1952 |
| 2,597,328 | Hosea | May 20, 1952 |
| 2,619,879 | Hosea | Dec. 2, 1952 |
| 2,682,698 | Berthiez | July 6, 1954 |
| 2,744,450 | Walter | May 8, 1956 |
| 2,775,148 | Campbell | Dec. 25, 1956 |
| 2,806,390 | Zwick | Sept. 17, 1957 |
| 2,880,630 | Hake | Apr. 7, 1959 |

FOREIGN PATENTS

| | | |
|---|---|---|
| 240,408 | Great Britain | Jan. 27, 1926 |

OTHER REFERENCES

"Right-Angle Indexing Head for Horizontal Boring Mills," by Dwight D. Wells, page 199 in Machinery Magazine, December 1955 issue.